US010926796B1

(12) United States Patent
Beech

(10) Patent No.: US 10,926,796 B1
(45) Date of Patent: Feb. 23, 2021

(54) TOWBAR CONTROLLED STEERING SYSTEM

(71) Applicant: Geoffery S. Beech, Madison, AL (US)

(72) Inventor: Geoffery S. Beech, Madison, AL (US)

( * ) Notice: Subject to any disclaimer, the term of this patent is extended or adjusted under 35 U.S.C. 154(b) by 355 days.

(21) Appl. No.: 15/839,794

(22) Filed: Dec. 12, 2017

Related U.S. Application Data

(63) Continuation-in-part of application No. 14/686,744, filed on Apr. 14, 2015, now Pat. No. 9,840,277, which is a continuation-in-part of application No. 13/628,261, filed on Sep. 27, 2012, now Pat. No. 9,004,519.

(60) Provisional application No. 61/626,961, filed on Sep. 28, 2011.

(51) Int. Cl.
| | |
|---|---|
| *B62D 13/00* | (2006.01) |
| *B62D 13/02* | (2006.01) |
| *B60D 1/24* | (2006.01) |
| *B62D 13/06* | (2006.01) |
| *F16H 25/20* | (2006.01) |

(52) U.S. Cl.
CPC ............ *B62D 13/06* (2013.01); *B60D 1/245* (2013.01); *B62D 13/025* (2013.01); *F16H 25/20* (2013.01)

(58) Field of Classification Search
CPC ...... B62D 15/025; B62D 13/00; B62D 13/02; B62D 13/06; B60D 1/145; B60D 1/24
See application file for complete search history.

(56) References Cited

U.S. PATENT DOCUMENTS

| | | | | |
|---|---|---|---|---|
| 3,012,638 A | * | 12/1961 | Morlik | B60T 11/046 188/192 |
| 4,153,132 A | * | 5/1979 | Biedebach | B62D 13/00 180/420 |
| 4,655,467 A | * | 4/1987 | Kitzmiller | B60G 11/225 280/124.128 |
| 5,340,142 A | * | 8/1994 | Kuhns | B62D 13/04 280/444 |
| 6,158,759 A | * | 12/2000 | Perry | B62D 13/04 280/444 |
| 6,273,446 B1 | * | 8/2001 | Paul | B62D 13/04 280/442 |
| 6,431,576 B1 | * | 8/2002 | Viaud | B62D 13/025 280/419 |
| 9,004,519 B1 | * | 4/2015 | Beech | B62D 13/04 280/442 |
| 9,016,711 B1 | * | 4/2015 | Mathews | B62D 13/06 280/492 |
| 9,840,277 B1 | * | 12/2017 | Beech | B60D 1/145 |
| 2005/0077703 A1 | * | 4/2005 | Tango | B62D 13/04 280/442 |

* cited by examiner

*Primary Examiner* — Tony H Winner
(74) *Attorney, Agent, or Firm* — Patent Grove LLC; Tomas Friend

(57) ABSTRACT

A towbar controlled steering system is disclosed. A towbar pivots about a pivot point on a wagon front axle, with steering rods connected to steered wheels. At the towbar, the steering rods are attached to a carriage that moves ends of the steering rods in front of (towing position) or behind (backing position) the towbar pivot point. When backing, the wheels are steered in opposite directions as sideways towbar displacement. An automated system senses towbar angle and attenuates steering sensitivity while backing to keep the wagon along a backwards track defined by the tow vehicle.

8 Claims, 14 Drawing Sheets

TOWBAR CONTROLLED STEERING SYSTEM

CROSS REFERENCE TO RELATED APPLICATIONS

This application is a continuation-in-part of Applicant's U.S. patent application Ser. No. 14/686,744, filed Apr. 14, 2015, which is a continuation-in-part of Applicant's U.S. patent application Ser. No. 13/628,261, filed Sep. 27, 2012, which issued as U.S. Pat. No. 9,004,519 on Apr. 14, 2015. Application Ser. No. 13/628,261 claimed the benefit of Applicant's U.S. provisional application No. 61/626,961, filed Sep. 28, 2011. Application Ser. Nos. 14/686,744, 13/628,261 and 61/626,961 are all incorporated herein by reference in their entirety.

FIELD OF THE INVENTION

This application is related generally to steering systems for trailers and wagons that use a towbar that pivots horizontally about a pivot point for steering wheels of the wagon, and particularly to automated steering systems such that when backing a trailer, the towbar is decoupled from the steered wheels and the steered wheels steered in accordance with towbar angle to keep the wagon along the same arc or path that the tow vehicle is taking while backing.

BACKGROUND OF THE INVENTION

Steerable trailers or wagons are characterized by a tow bar (tongue) connection between a trailer and tow vehicle, the tow bar comprising a first horizontal pivot and a first vertical pivot at the tow vehicle hitch and a second vertical pivot and second horizontal pivot at the front of the trailer chassis. The vertical pivots decouple the vertical trailer loads on the rear of the tow vehicle suspension and provide for improved handling by eliminating trailer weight on the hitch. The dual horizontal pivots at the towbar and trailer allows steering of the front wheels via steering rods attached between the front wheels of the trailer and the towbar such that horizontal towbar displacement steers the wheels, but cause the trailer to be difficult to steer while backing. A backing operation involving two horizontal pivots with such a trailer has been compared to "pushing a rope".

Applicant has invented backing systems for trailers as disclosed in the aforementioned incorporated patent and patent applications. These disclosures generally teach systems wherein steering rods are attached at one end to steered wheels, and attached at opposite ends to a sliding member on the towbar that moves these steering rod ends from a towing position on one side of the pivot point that the towbar pivots about to a backing position on the other side of the pivot point. Thus, when in the towing position, the front wheels are steered in the same direction that the towbar is moved or displaced laterally from a straight ahead towing position, and when in the backing position the front wheels are steered in an opposite direction that the towbar is moved or displaced laterally.

An improvement is disclosed herein that provides for automated backing of a wagon with steered wheels on the front axle, minimizing cost of manufacture, and automatically steered front axle wagons archetypes. Such improvements are practicable with various embodiments, some of which are applicable for retrofitting existing wagons and others applicable for fabrication of new wagons. Each embodiment may incorporate technology that employs proportional, integral, derivative (PID) or combinations thereof, and other forms of feedback control to effect controlled backing of an automotive trailer having dual horizontal pivots. Significantly, no special hitch is needed on the tow vehicle so that a wagon of the instant invention can be towed by any tow vehicle with a corresponding hitch as is on the wagon.

DETAILED DESCRIPTION OF THE DRAWINGS

Figure 1:
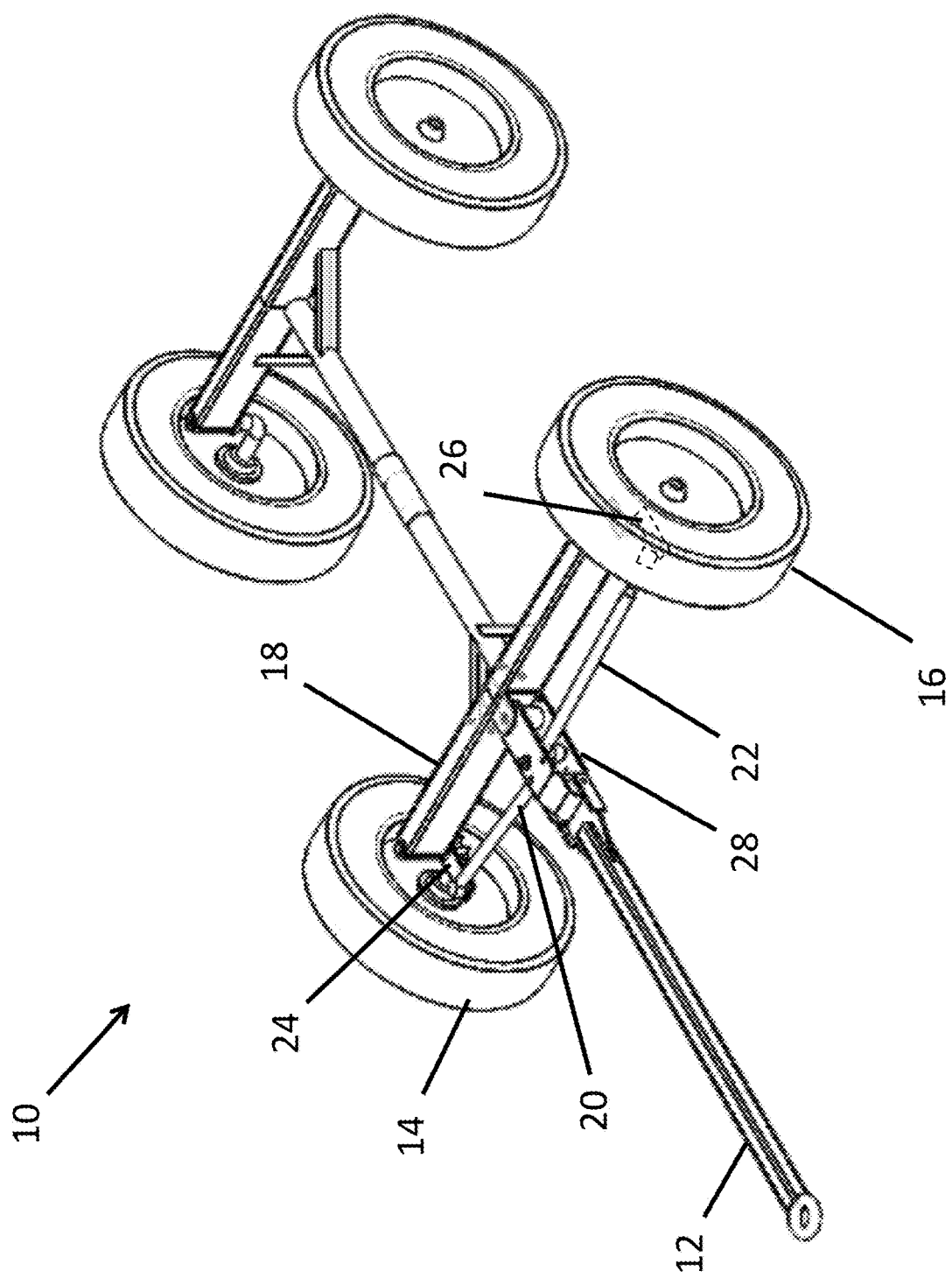
FIG. 1 is a perspective view of a prior art towbar steered wagon chassis.

Referring initially to FIG. 1, a prior art wagon 10 that can be retrofitted with the instant invention is shown. Trailer 10 comprises a towbar 12, steered wheels 14, 16, the wheels mounted, as by a kingpin or steering ball joints (not shown) to ends of a fixed front axle 18, with automotive-type steering tie rods 20, 22 connected by knuckle joints between towbar 12 and steering arms 24, 26 fixed to steered wheels 14, 16, respectively. Steering arms 24, 26, in this wagon, are oriented forward as shown with respect to axle 18. A bracket 28 is connected between towbar 12 and axle 18 to allow vertical pivoting movement of towbar 12 and horizontal pivoting movement for steering wheels 14, 16 via steering tie rods 20, 22. Other conventional wagons have steering arms facing aft, behind front axle 18 that can be reconfigured left to right and right to left, to orient steering arms 24, 26 forward prior to incorporating modification as disclosed in the instant invention. In such a typical prior art wagon, and referring to FIG. 2, bracket 28 incorporates a vertical pivot for allowing towbar 12 to pivot vertically is implemented by a horizontal clevis pin or tube 30 on bracket 28, tube 30 pivotally fitted to a horizontal clevis 32 on towbar 12. The horizontal pivot for steering the wheels is implemented by a vertical clevis pin or tube 34 on bracket 28, and which is fitted for pivoting movement in a vertical clevis 36 mounted to axle 18. Steering tie rods 20, 22 are attached via knuckle joints 38, 40 to openings 42, 44 in bracket 28. With this construction, when towbar 12 is moved sideways, bracket 28 pivots about pin or tube 34, which moves tie rods 20, 22 to steer wheels 14, 16 in the same direction the tow bar is moved horizontally.

Figure 2:
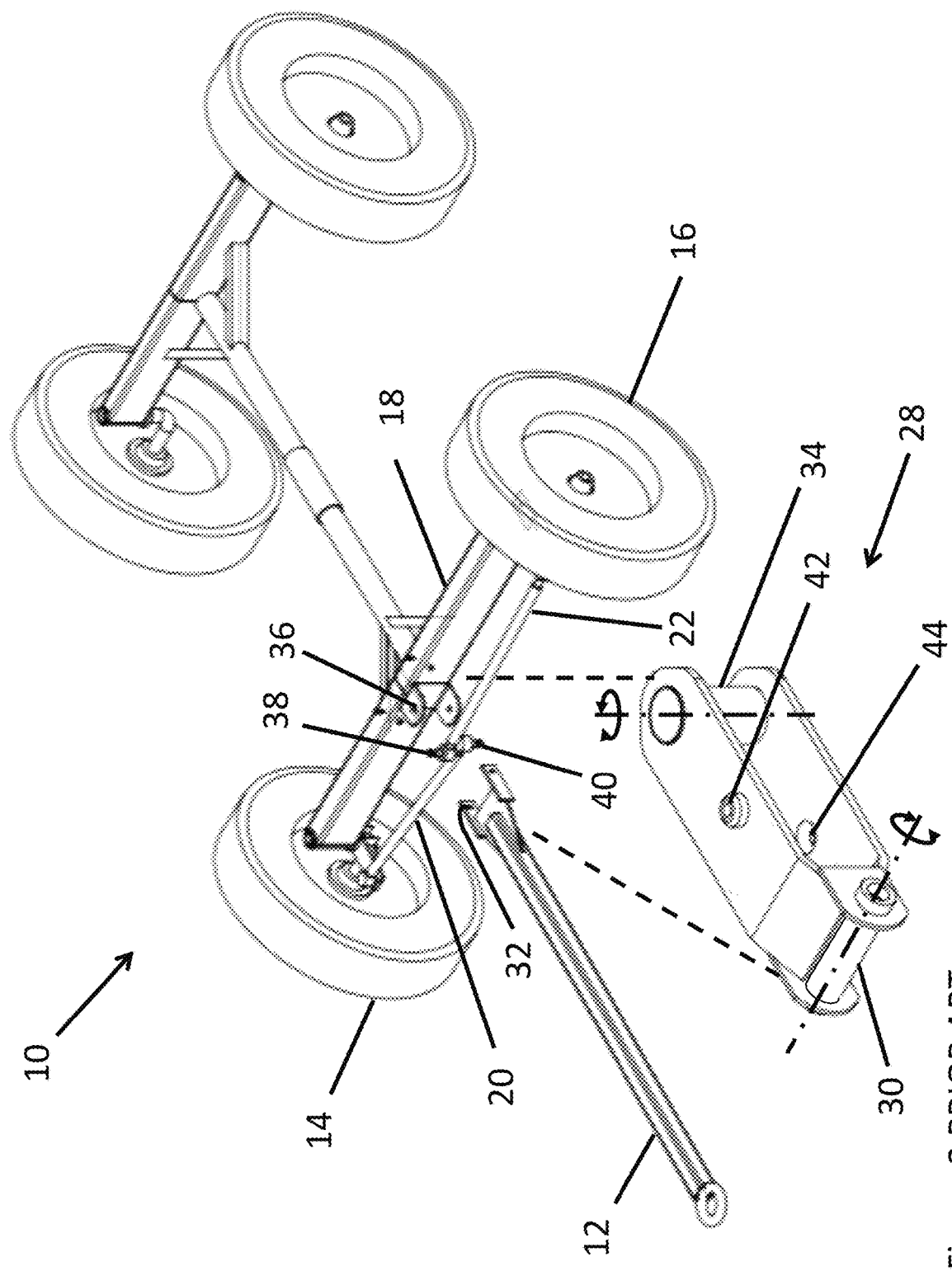
FIG. 2 is an exploded perspective view of parts of the chassis of FIG. 1.
Figure 3:
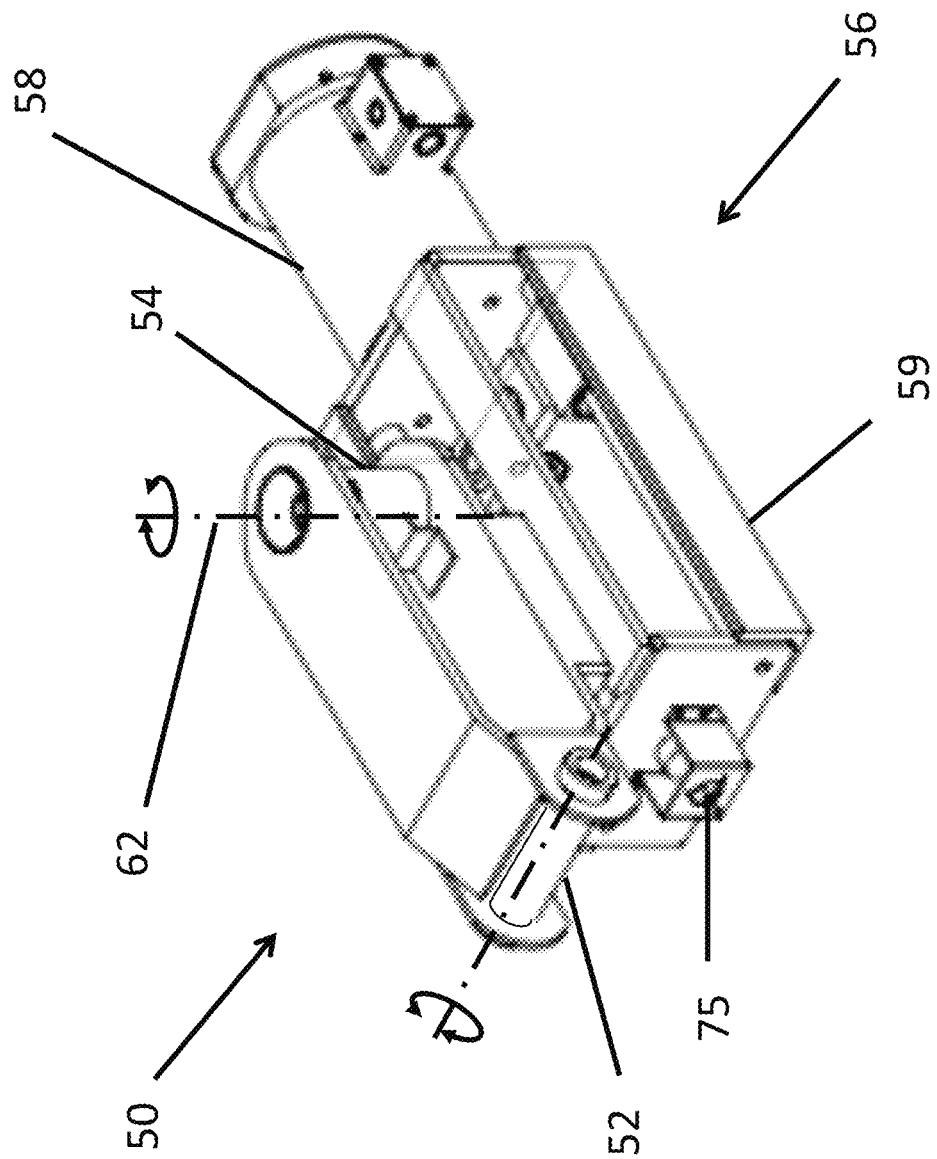
FIG. 3 is a perspective view of a trailer bracket of the instant invention
Figure 4:
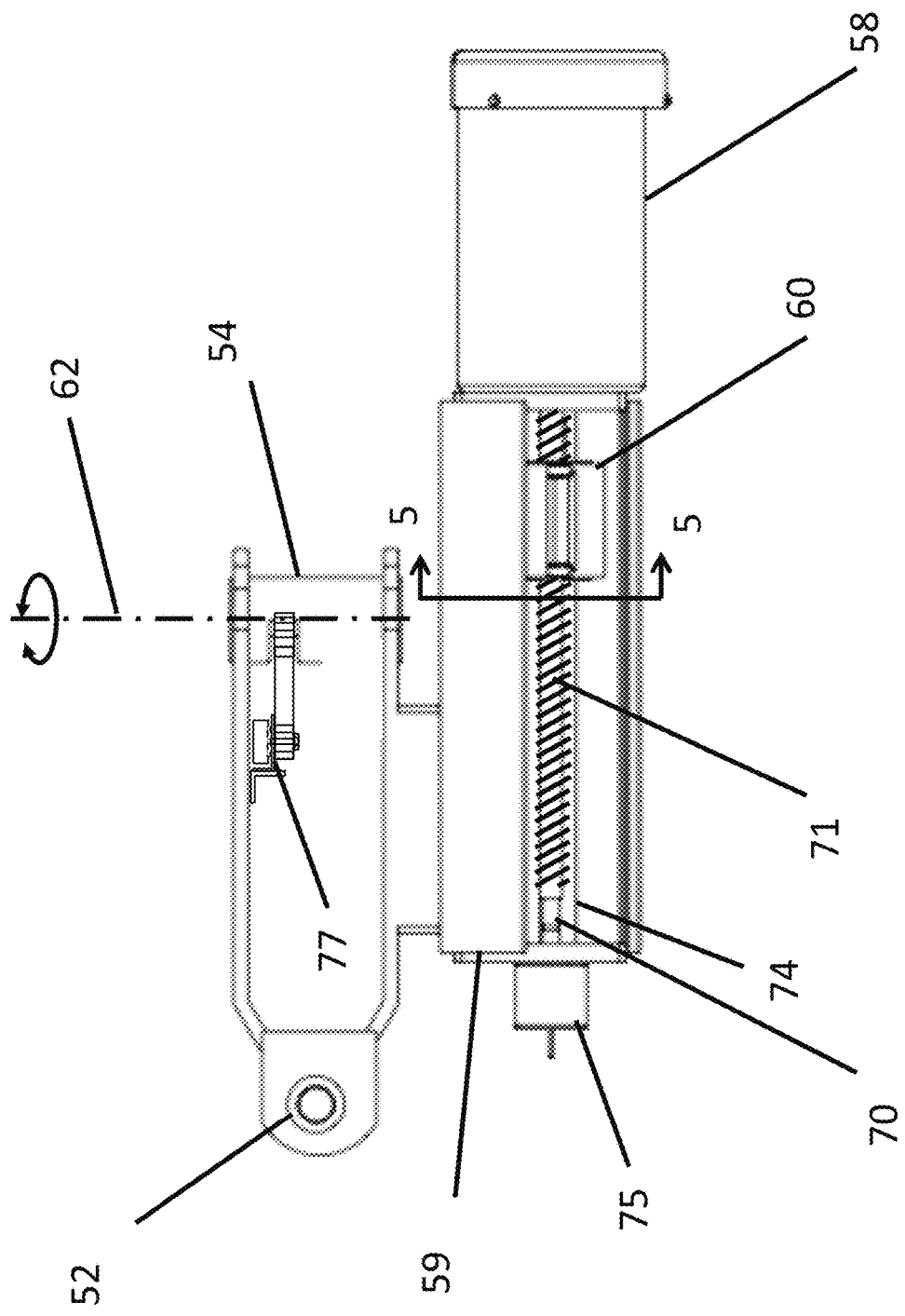
FIG. 4 is an elevational view of the bracket of FIG. 3.
Figure 5:
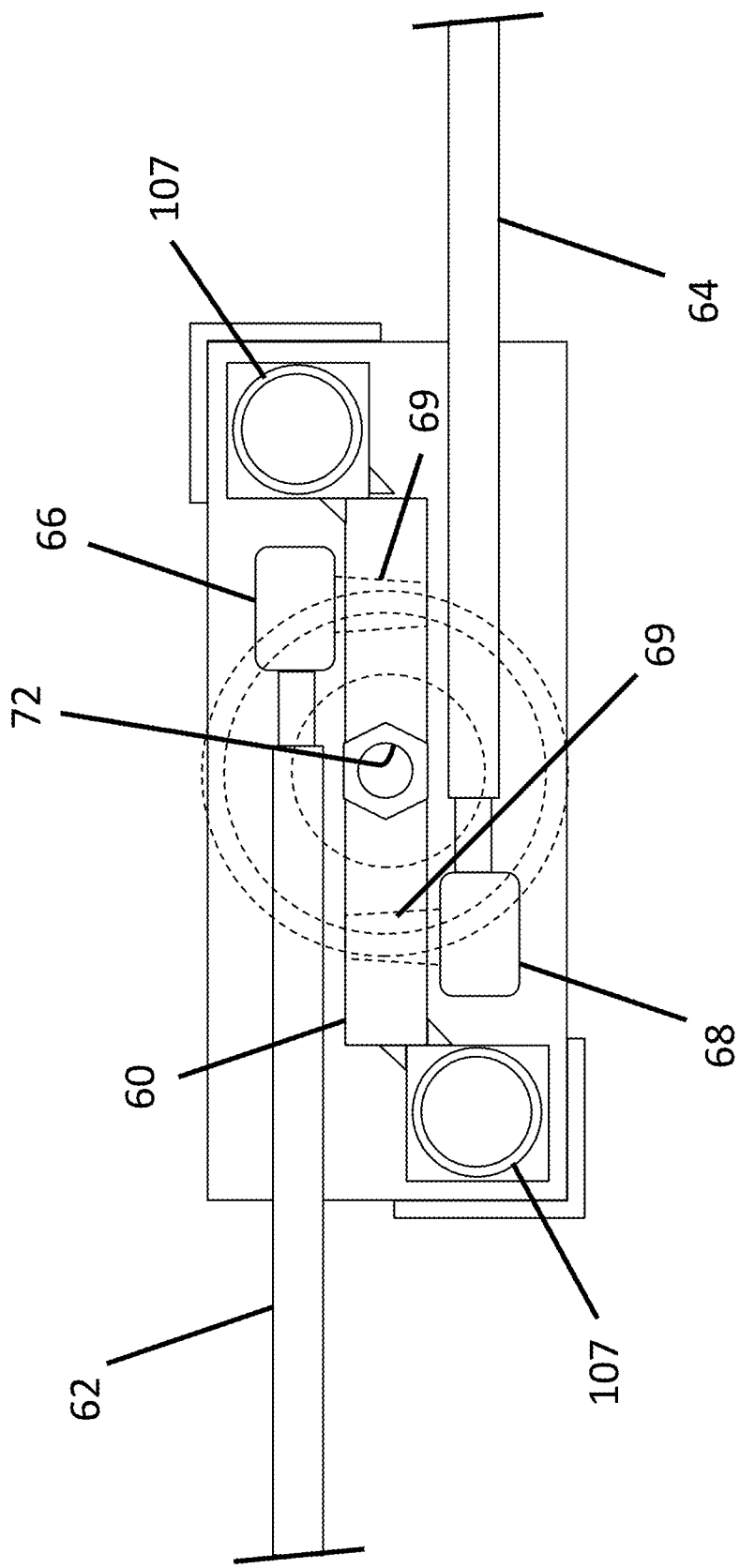
FIG. 5 is a diagrammatic view showing construction of the bracket of FIG. 4.
Figure 6:
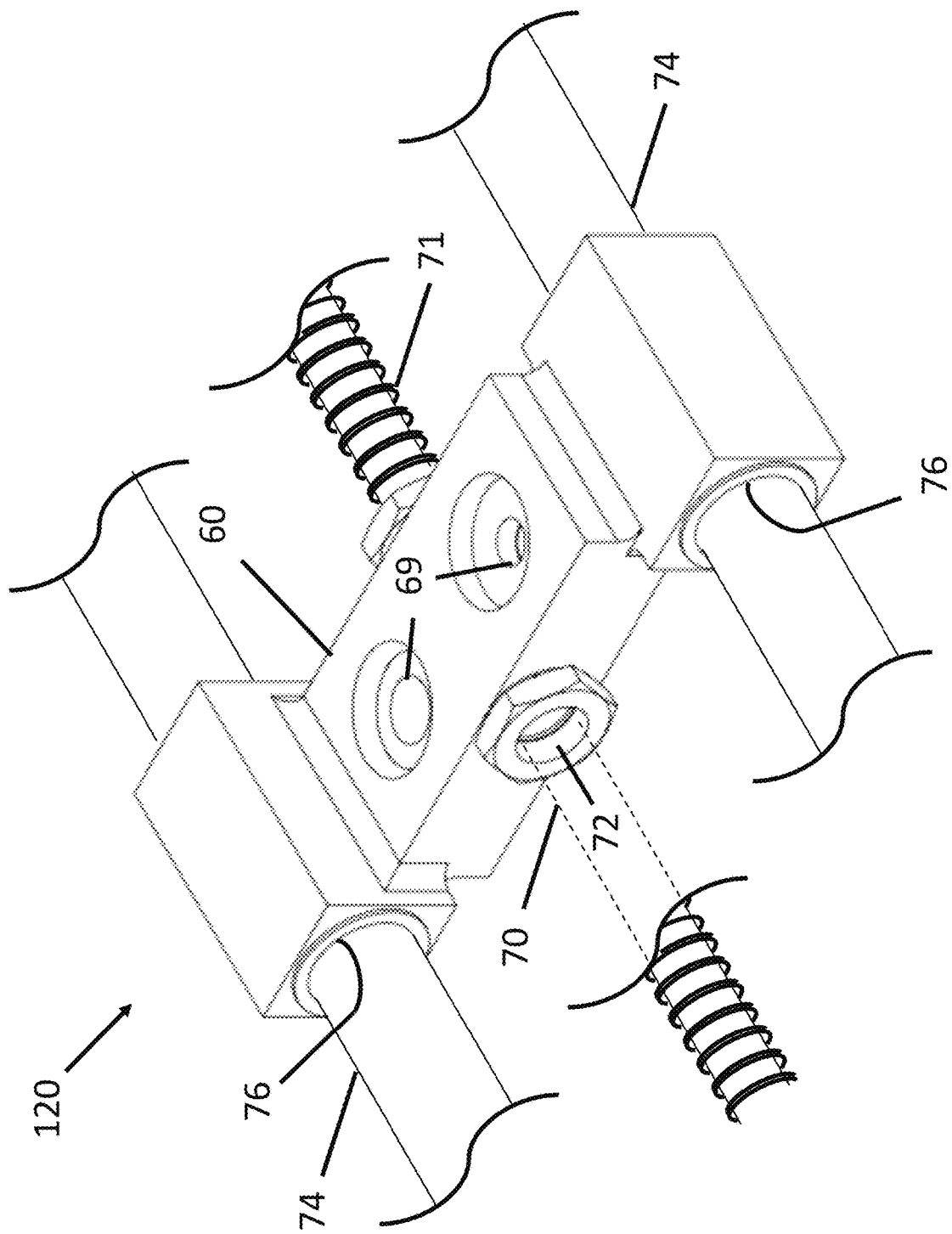
FIG. 6 illustrate construction details of the bracket of the instant invention.

FIG. 3 shows an embodiment of a bracket 50 of the instant invention that replaces bracket 28 of FIGS. 1, 2 in order to convert or retrofit a conventionally steered wagon to a wagon of the instant invention having greatly enhanced, and in some instances automated, backing capabilities. Here, as with the prior art, a horizontal clevis pin or tube 52 is fitted into clevis 32 (FIG. 2) for enabling vertical pivoting of drawbar 12, and vertical clevis pin or tube 54 (FIG. 3) is fitted into clevis 36 (FIG. 2) to enable horizontal pivoting of drawbar 12. A steering control assembly 56 is mounted to and below the bracket portion, and includes a control actuator 58, which may be an electric motor, such as a stepper motor, a servo motor or the like, or a linear actuator that may be electrically, manually, hydraulically, or pneumatically powered. Where an electric motor is used, a gear reduction set may be incorporated with the motor for additional mechanical advantage. A robust structural enclosure 59 houses internal components of steering control assembly 56. As shown in FIG. 4, actuator 58 is operatively connected to move a carriage 60 within enclosure 59 to any position to one side or another of axis 62 of vertical pivot pin or tube 54. FIG. 5 shows steering tie rods 62, 64 connected to carriage 60 by knuckle joints 66, 68 respectively, that are connected to conical openings 69 in carriage 60 so that ends of the steering tie rods are moved with the carriage to any position on one side or the other of axis 62 (FIG. 4). With the steering tie rod ends on one side of axis 62, the wheels are steered in the same direction as horizontal towbar movement. With the steering tie rod ends on the other side of axis 62, the wheels are steered in opposite directions to horizontal towbar movement, as will be further explained. Significantly, the offset arrangement of connection of the steering knuckles 60, 66 in FIG. 5 allows for a flat profile, which provides more ground clearance than embodiments of the prior art. In addition, such an arrangement maintains an Ackerman steering geometry.

Where an electric motor, such as a geared servomotor, is used as actuator 58, the gear motor shaft is connected to a lead screw 70 (FIG. 6. Threads 71 on the lead screw engage threads 72 (FIG. 5, 6) incorporated in carriage 60 to drive carriage 60 to any position on the lead screw. The lead screw is supported at each end in enclosure 59 by appropriate structural bearings 73 (FIG. 3, only one shown in the distal end of enclosure 59). In addition to the lead screw, carriage 60 is further supported in sliding relation by structural members, such as rods 74, that are in turn supported at each end at the end walls of enclosure 59. Rods 74 extend through openings 76 of carriage 60 to allow carriage 60 to slide along rods 74 when motor 58 rotates lead screw 70. Appropriate bearing materials are used between the rods 74 and openings 76 of carriage 60, along with appropriate lubricants on the rods and lead screw. In addition, since the steering tie rods must extend outward from enclosure 59 through a longitudinal slot 61 (FIG. 3) corresponding to all possible positions of carriage 60 along lead screw 70, flaps of a resilient material, brushes or a sliding window structure, may be used to cover the slots to generally prevent entry of water, dirt and other contaminants into the interior of enclosure 59. Since enclosure 59, carriage 60, rods 74 and lead screw 70 and associated components must bear steering loads associated with towing and backing the wagon or trailer, they would be fabricated of hardened, robust materials, and sealed against harsh environmental conditions.

Sensors are provided to sense at least towbar angle, and in some embodiments rate of change of the towbar angle with respect to the chassis or stationary front axle, and position or location of carriage 60. Rate of change is used when PID-type controllers are used to control steering. Here, carriage position sensor 75 (FIG. 4), which may be a shaft encoder or any other appropriate encoder, as would be apparent to one of ordinary skill in the art, is mounted to sense rotation and rotation angles of lead screw 70. A microprocessor in a controller on the wagon would count and keep track of number of rotations of the lead screw, thus keeping track of location or position of carriage 60. Sensor 77, which may be another encoder, such as an absolute encoder or any other appropriate encoder for providing angular information, as would be apparent to one of ordinary skill in the art, has a body fixed on or near vertical pivot tube 54, with its shaft rotatably connected to a pin or the like fixed to the chassis or front axle, such as first kingpin 116 in FIG. 10 as by belts and pulleys, sprockets and drive chains or meshing gears. As such, as the towbar is rotated about axis 62, encoder 77 provides a signal representative of towbar angle with respect to fixed front axle 18 (FIGS. 1, 2). In addition, limit switches (not shown) are provided at each end of travel of carriage 60 within enclosure 59, with the first limit switch mounted, by way of example, to an inner wall of the distal end of enclosure 59 that supports bearing 73 and sensor 75 (FIGS. 3, 4). A second limit switch, also by way of example, is mounted to an inner wall of the proximal end of enclosure 59 that supports actuator 58. The first limit switch at the distal end of lead screw 70 is activated by contact with carriage 60, and prevents damage to the enclosure, lead screw and carriage by providing a signal that stops rotation of the lead screw, thus stopping the carriage before it contacts the distal end wall of enclosure 59 or runs out of thread on the lead screw. The second limit switch at the proximal end of the lead screw near actuator 58 is also activated by contact with carriage 60, and similarly prevents damage to the carriage, lead screw and enclosure by providing a signal that stops rotation of the lead screw. In addition, position of the first limit switch is used to set a reference point for towing wherein the steered front wheels are steered directly with sideways towbar displacement. In other words, carriage 60 is positioned at a towing position where the front wheels are steered to accurately track wheels of a tow vehicle while towing as determined by sideways towbar displacement after the carriage contacts the second limit switch.

The signal provided by this first limit switch may be used to reference sensor 75 to a reference position when the carriage contacts the first limit switch, and then activate servo motor 58 a predetermined number of turns of lead screw 74 to drive carriage 60 to the towing position. In other embodiments, the towing position may be the position of the carriage when it activates the first limit switch. Where the carriage is driven to a towing position a short distance away from the first limit switch after activating the first limit switch, power to motor 58 may be interrupted so that the wagon may be safely towed without any chance of the carriage being moved. Since it would be very difficult for steering loads to backdrive the lead screw to shift the position of carriage 60, no movement of carriage 60 would occur during towing with motor 58 deenergized. However, encoder 75 could still be used to monitor position of carriage 60, and reenergize motor 58 to correct position of carriage 60 if necessary, or provide a signal to an operator that the carriage position has shifted and recalibration of the carriage position is necessary. In other embodiments, a positive lock, such as a solenoid-driven pin on the carriage driven through an opening in the enclosure, may be used to lock the carriage in place. This would also relieve steering stresses on the leadscrew and rods that the carriage rides along. Typically, the towing position of carriage 60 on lead screw 70 would be only a short distance from the distal wall of enclosure 59, such as perhaps an inch or so, in order to allow extreme backing corrections that may move the carriage past the towing position toward the distal wall of enclosure 59, as will be further explained. In addition, positioning the carriage at a towing position a short distance from the first limit switch eliminates excessive wear and tear on the limit switch.

Significantly, and referring to FIGS. 4 and 5, it is noted that a null position exists where if the knuckle joints 66, 68 connecting the steering tie rod ends to carriage 60 are positioned directly under axis 62 (FIG. 4) corresponding to the horizontal pivot point of the towbar, then no steering of the wheels occurs when the towbar is moved sideways. Such a null position allows the wagon to be backed straight back irrespective of towbar angle.

Figure 7:
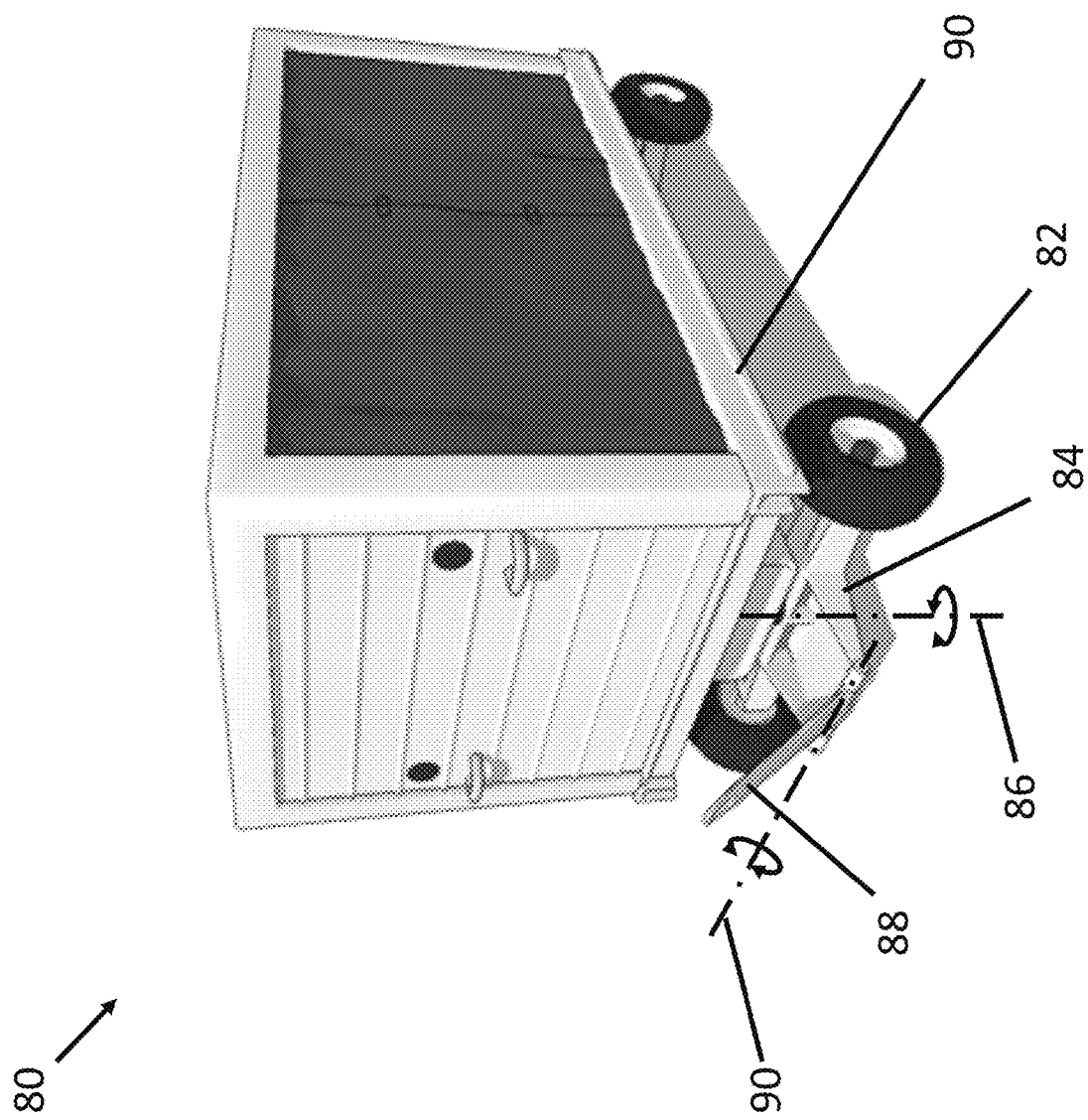
FIG. 7 is a perspective view of a prior art wagon having a steered axle.

Another prior art wagon or trailer is shown in FIG. 7, which shows a conventional steered-axle wagon 80 that can be converted into a wagon of the instant invention that has greatly enhanced backing capabilities. Such a wagon has front wheels 82 that are fixed to a front axle 84, the axle in turn is mounted to the front of the wagon by a kingpin or the like so that the entire axle 84 rotates horizontally about an axis 86. A drawbar 88 is mounted to axle 84 for vertical pivoting movement about an axis 90 so that hitch weight on the tow vehicle is minimal, but rigidly fixed to axle 84 with respect to horizontal movement. Thus, horizontal movement of drawbar 88 caused by turning of the tow vehicle pivots axle 84 about axis 86 in order to steer the trailer. Such a trailer is commonly used for aviation support to handle baggage, fuel, power, water, air conditioning equipment and other heavy loads, and is typically pulled along by a tug.

Figure 8:
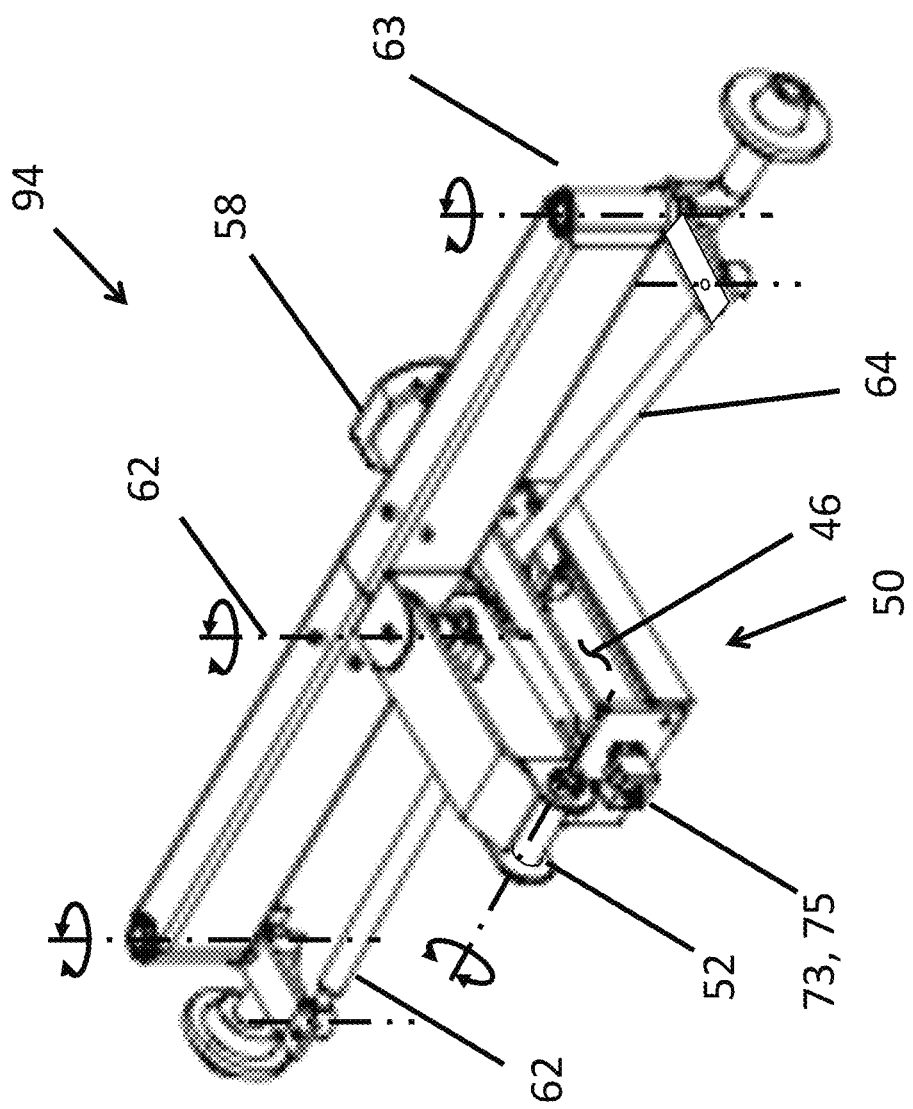
FIG. 8 illustrates a retrofit front axle for the trailer of FIG. 7

A retrofit of such a trailer 80 into a steered trailer of the instant invention may be accomplished by replacing the front axle thereof with an axle assembly 94 (FIG. 8) having a bracket 50 of the instant invention. Axle assembly 94 would be fixedly welded or attached by fasteners to the front chassis of wagon 80 in the manner of a conventional wagon. Steering tie rods 62, 64 extend from knuckle joints mounted on carriage 60 (FIG. 5) extend through slots 46 (only one shown in FIG. 8) which are covered by resilient protective covers, brushes or the like (not shown) to allow for movement of the steering tie rods as carriage 60 is moved. As noted above, such covers or brushes protect interior components of enclosure 59 from environmental contaminants.

In another embodiment of an axle having fixed wheels, the entire axle itself may be steered. Here, and referring to FIG. 9, a wagon 100 of the instant invention having wheels 102 fixed to an axle 104 and steering mechanism 106 is shown. Towbar 108 is fixed to steering mechanism 106 with respect to horizontal movement, but is pivotally connected to allow towbar 108 to pivot vertically as described above. Steering mechanism 106 decouples wagon tow bar 108 from axle 104 when backing, and allows axle 104 to be rotated about a first kingpin 110 by driving a gear 112 in accordance with the instant invention. During towing, axle 104 is locked to steering mechanism 106 so that the locked assembly of tow bar 108 and axle 104 rotates about a second kingpin 116 fixed to wagon chassis 114, allowing the front axle to be steered conventionally by sideways towbar displacement.

Figure 10:
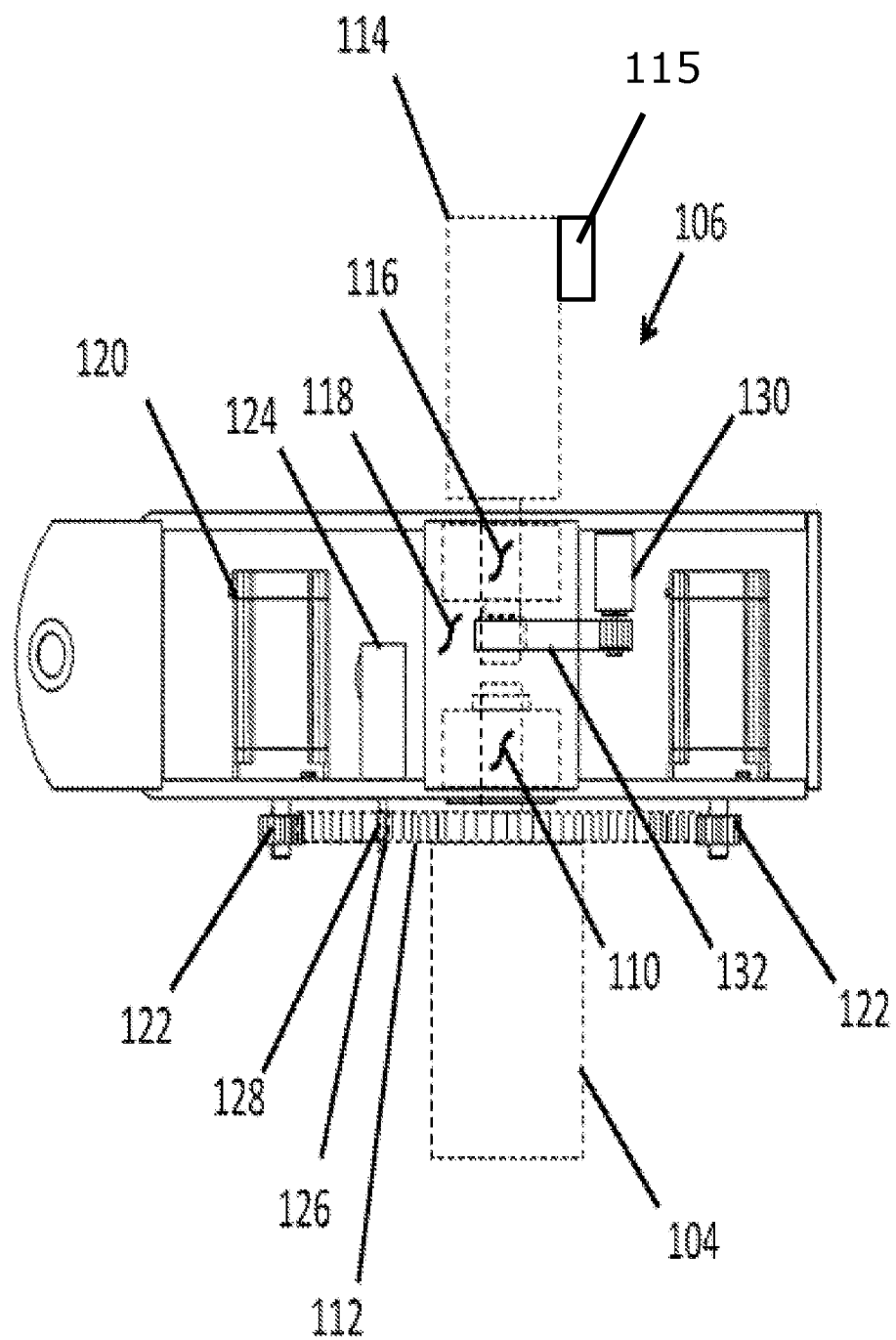
FIG. 10 is a bracket for the steered axle embodiment of FIG. 9.

Referring now to FIG. 10, a view of steering mechanism 106 is shown. Vertical structural member 118 supports bearing support members (not shown) that hold automotive-type bearings (not shown), which may be tapered wheel bearings, that that rotatably hold first kingpin 110 fixed to axle 104 and gear 112, and second kingpin 116 fixed to wagon chassis 114. As shown, first kingpin 110 extends into steering mechanism 106 from below and second kingpin 116 extends into steering mechanism 106 from above. Bearing surfaces (not shown for clarity) are provided between gear 112 and structural member 106, and between chassis 114 and structural member 106 to allow for smooth rotation between gear 112, chassis 114 and lower and upper surfaces of structural member 106, respectively. One or more motors 120, which may be stepper motors, are provided within steering mechanism 106, the motors provided with pinions 122 on shafts thereof that meshably engage with gear 112 on axle 104 to rotate axle 104 to a desired position while backing the wagon. While a single stepper motor may be used, such a single motor would have to be sufficiently fast and powerful to drive axle 104 to a required position as rapidly as needed, and such motors may be prohibitively expensive. In addition, since the angles that axle 104 would be rotated to are limited, wear on gear 112 would be limited to an arc around a periphery of the gear. Use of at least two motors 120, 120a would mean that smaller, much less expensive motors could be used, and when located across each other as shown, would distribute wear and loads over twice as much of the periphery of gear 112. During towing, one or more solenoids 124 drive a pin 126 into an opening 128 in gear 112 to lock axle 104 and steering mechanism 106 together, allowing the wagon to conventionally be steered as a steered axle wagon. As should be apparent, opening 128 is located at a position in gear 112 such that towbar 108 is perpendicular to axle 104. An encoder or the like 130 is mounted to sense rotation angle of second kingpin 116, as by a belt, chain, gear or the like 132 operatively attached between second kingpin 116 and a shaft of encoder 130. Here, as second kingpin 116 rotates with respect to steering mechanism 106, encoder 130 provides a signal indicating angle of such rotation. A reference for the angle, as measured from 0 degrees of rotation or other reference angle, may be a straight ahead position of the steering mechanism and the towbar, or with respect to axle 104 extending laterally in a straight towing or backing position. In addition, encoder 130 provides a rate of change of the angle between steering mechanism 106 and second kingpin 116.

As described above, steering mechanism 106 would include an enclosure that houses components thereof, and generally protects such components from harsh environmental conditions.

Nominal Towing and Nominal Backing Configurations

Each automatic steered-wheel embodiment comprises operational constraints that the wagon track straight when towing straight and track straight back when backing straight; these operational constraints are implemented in a simplified linear actuator design.

Figure 11:
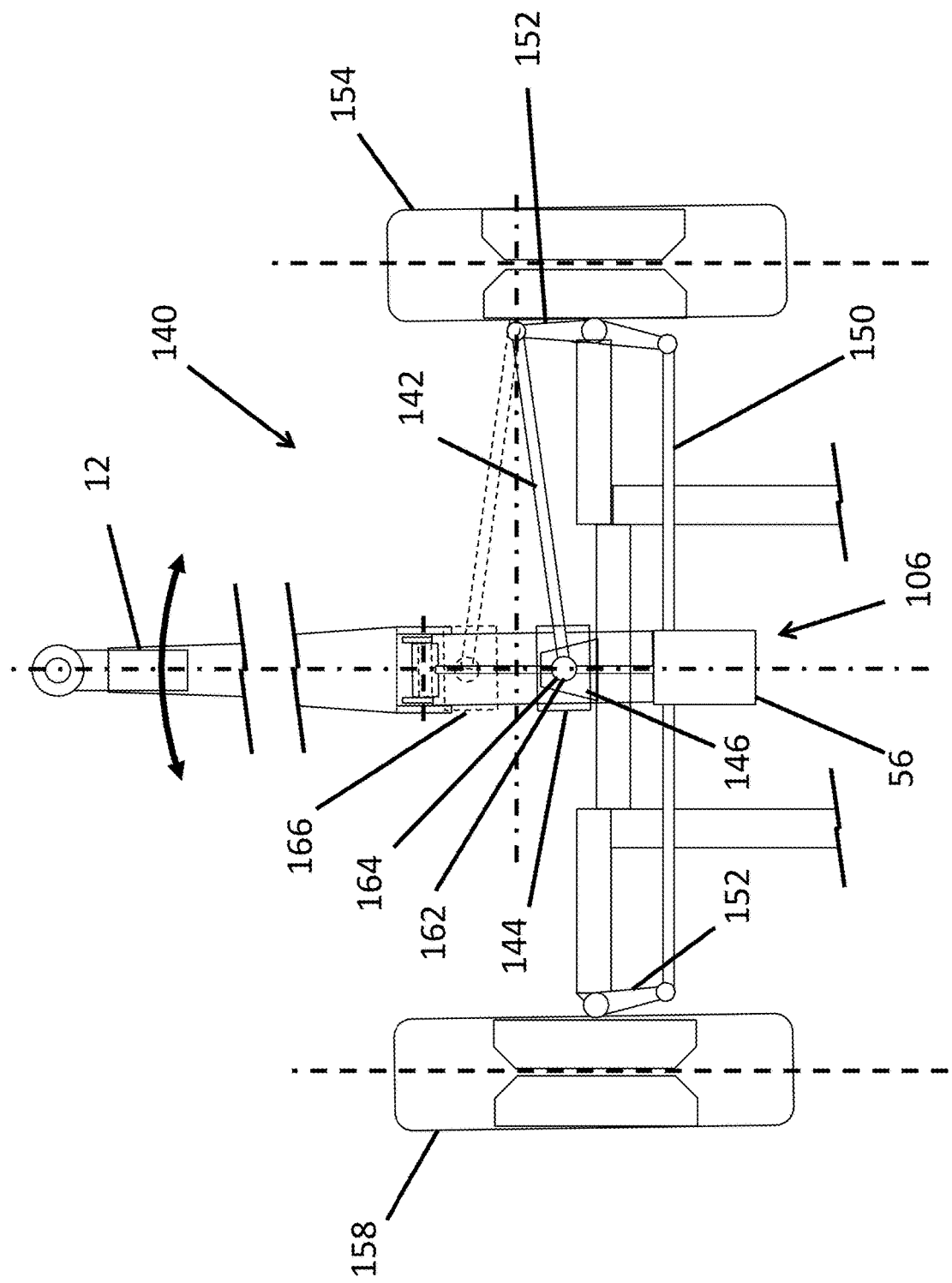
FIG. 11 is a diagrammatic illustration showing operation of the embodiment of FIG. 3.

FIG. 11 is a top view of a wagon 140 of the instant invention for the steered wheel embodiments wherein a single steering rod 142 is attached between a carriage 144 position 146 (solid lines) and right wheel 154. A drag link 150 is attached between steering arm 152 of wheel 154 and steering arm 156 of wheel 158. While a drag link 150 is shown, it should be apparent that two steering arms, as shown by steering arms 62, 64 in FIG. 5, may also be used with similar results. With carriage 144 in the dashed line position 166, a nominal configuration exists wherein the wheels track in the same direction as sideways towbar movement. In other words, there is no inadvertent turning of the wheels due to steering knuckle 164 of steering arm 142 moving in a straight line instead of an arc. When carriage 144 is moved backwards to the solid line position 146, a null or nominal backing position is defined as described above wherein wheels 154, 158 track straight when backing the wagon, independent of tow bar 12 movement. Thus, in the unique nominal towing configuration, steered wheels 154 and 158 track straight forward when pulled straight forward and in the nominal backing configuration the steered wheels track straight backward when said trailer pushes straight backward. If carriage 144 is moved away from nominal towing and nominal backing positions while towbar 60 is straight forward, the wagon would not track straight, an undesirable effect to be avoided. To affect automatic steering while backing and as towbar 12 is moved left or right of center while backing, carriage 144 is automatically moved forward and aft of the null or nominal backing position (solid line position146) by lead screw 70 (FIG. 4) in accordance with logic as will be further described.

Nominal towing and backing positions of a carriage are determined by length of steering arm 152 at the steered wheel 154. For instance, and referring to FIG. 11, if the distance between wheel pivot axis 153 and connection 155 of the dashed line position for steering tie rod 142 is 6 inches, then the nominal towing position 166 and nominal backing position 146 are equidistant, or 3 inches, in front of and behind a line lateral to the towbar in a straight ahead position, as shown by lateral dashed line 157. As such, for this example, the nominal towing position 166 of carriage 144 is 9 inches forward from wheel pivot axis 153, and the nominal backing position 146 of carriage 144 is 3 inches forward of wheel pivot axis 153. As the nominal towing position 166 of the carriage would typically be fixed, except perhaps adjustable for maintenance purposes, there would be no need for carriage travel more forward than the nominal towing position 166. However, for backing, carriage travel may extend to twice the distance from nominal towing position 166 to nominal backing position 146, or in the above example about 6 inches, aft of nominal backing position 146.

Referring back to FIG. 1, steering leverage is the distance along towbar 12 between a pivotal attachment of tow bar 12 to axle 18 and pivotal attachment of steering tie rods 20, 22 along tow bar 12. On conventional wagons, steering leverage is fixed at approximately the same rotational length of steering arms 24 about pivotal attachment of wheels 14, 16 to axle 18. Steering leverage for the nominal towing configuration, as described in FIG. 11 is the same as with conventional wagons though it is anticipated that modulating towing position could be beneficial in certain scenarios.

Steering when backing is more responsive than steering when towing; for instance, a conventional forklift has a much smaller minimum turning circle than a conventional automobile with the same wheel base. To maintain stable control when backing, carriage 144 (FIG. 11) is adjusted relative to pivotal attachment of towbar 12 to axle 168 to develop sufficient steering leverage on towbar 12 for stable control of autonomous steering. When the towbar angle is changing during backing, as when backing a wagon around an arc and making corrections, carriage 144 is constantly changing as such corrections change the towbar angle. When backing the trailer around an arc without making corrections, carriage 144 is initially positioned to correspond to the arc and held steady to correspond to the unchanging towbar angle. In other words, backing a wagon of the instant invention is the same or similar to backing a tow vehicle as though a wagon were not attached at all.

To operate a wagon of the instant invention, the operator manually steers the tow vehicle as though there were no wagon attached, and the automatic steering system automatically steers the wagon along a common trajectory with backing of the tow vehicle, the wagon preceding the tow vehicle in turns left or right as well as tracking straight when backed straight.

Inputs to a control system for steered wheel, fixed axle embodiments, and referring, for example, to FIG. 4, are signals from a digital encoder 75 representative of carriage 60 position and signals from digital encoder 77 representative of angle of the towbar 12 with respect to the front axle, or wagon chassis. Encoder 77 also provides a rate of change, or frequency, signal of the towbar angle with respect to the front axle, as derived from a changing digital bit rate corresponding to how fast the towbar angle is changing. Where the towbar angle is constant, as when backing around an arc with no steering corrections, encoder 77 will indicate towbar angle relative to a straight ahead position of the towbar. When a steering correction is made, the towbar angle will change depending on whether the towbar angle is increasing or decreasing from a centered position and a rate of change of towbar angle will also be provided. The rate of change may be used to determine a speed in driving carriage 60 faster or slower in order to accommodate the new, changing towbar angles. In other embodiments the frequency, or rate of change of towbar angle may not be needed, with a microprocessor calculating where the carriage should be in almost instantaneous increments. By way of example, where encoder 75 reads 360 degrees for each rotation of lead screw 70, then calculations may be made by a microprocessor in one degree increments of towbar angle so that carriage 60 can be driven a predetermined number of degrees or rotations for each degree of towbar angle as the towbar angle changes. The number of degrees or rotations of the leadscrew per degree of towbar angle would be determined by thread pitch of leadscrew 70. The only requirement of simply calculating carriage position from each degree of changing towbar angle is that motor 58 would need to be sufficiently fast and powerful to drive the lead screw at a speed sufficient to keep up with changing towbar angles (referred to as phase margin). It has been found that a calculation rate of 30 calculations a second or so for determining carriage position with respect to towbar angle is well within the range of any anticipated rate of towbar angle change, and well within speed of most microprocessors, as would be apparent to one of ordinary skill in the art. 30 calculations a second for carriage position would correspond to a fastest towbar towbar swinging rate, for instance, from a straight ahead position to a 30 degree position, in one second. However, this would be an extremely fast rate for backing a wagon. Similarly, motors of sufficient capacity to drive leadscrew 70 in order to keep up with the microprocessor calculations, i.e. change of carriage position with towbar angle, exist, the selection of which would be apparent to one of ordinary skill in the art. Of course, a slower rate of calculation may be used with a correspondingly slower, less powerful motor, such as a calculation rate of perhaps 15-20 calculations per second corresponding to a rate of towbar change of 15-20 degrees in one second. Likewise, calculations may be made for greater than one degree increments of towbar change, such as a calculation of carriage position for every two or three degrees of towbar angle change, or even every 5 degrees, depending on the pitch of leadscrew 70. From this it should be apparent that the process of constantly adjusting position of carriage 60 with changing towbar angle causes carriage 60 to be dithered about the nominal, or null, backing position as minor corrections in backing are made in order to cause the tow vehicle and wagon to be backed as though no wagon was attached to the tow vehicle.

Figure 12:
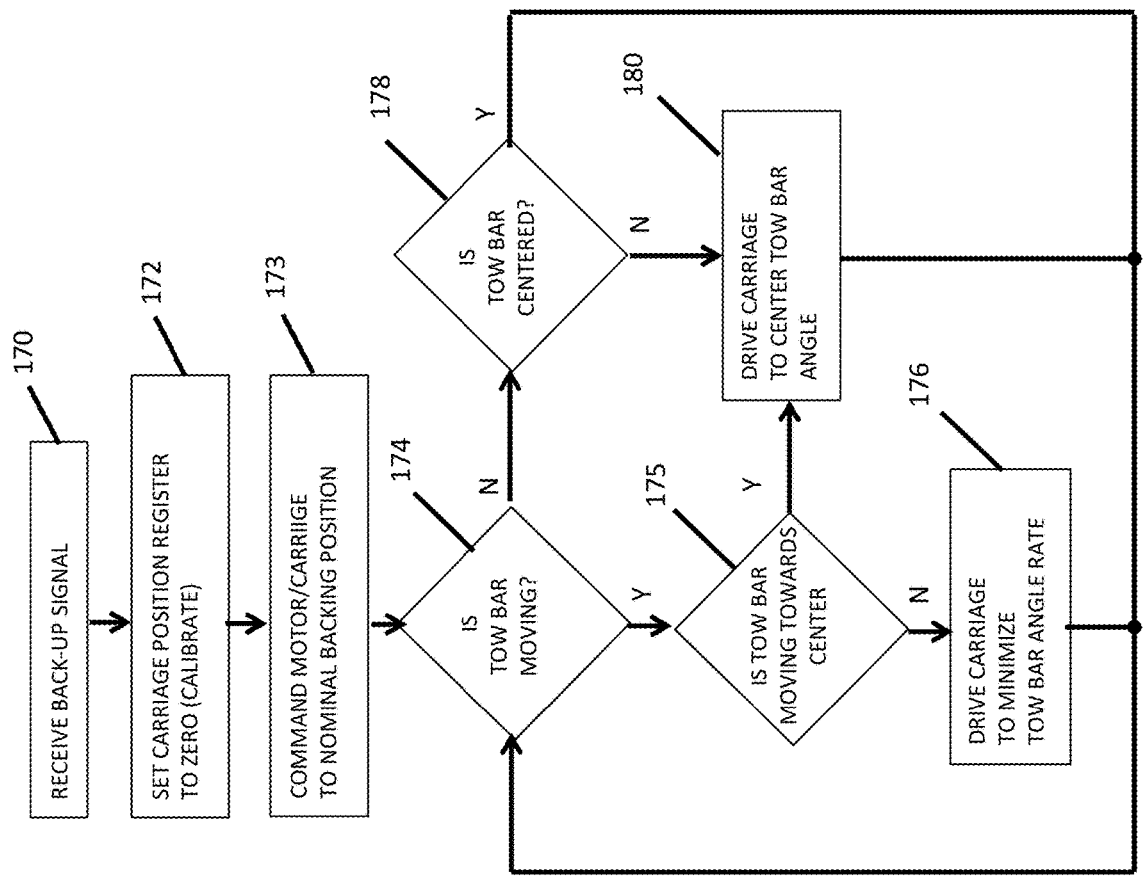
FIG. 12 is a process flow of logic for operating the embodiment of FIG. 3.

Referring to FIGS. 11 and 12, a general process of operation for a steered wheel fixed axle wagon is shown. At box 170 (FIG. 12A), the tow vehicle sends a command to the microprocessor on the wagon of the instant invention that the tow vehicle is about to commence backing the wagon. Such a signal may be taken from a back-up light of the tow vehicle when the tow vehicle is put in reverse, or by other indications such as a radio command from the tow vehicle to a receiver on the wagon (not shown). When the back-up signal is received by the microprocessor on the wagon, the microprocessor signals motor 56 to drive carriage 144 to a calibration position at box 172, which may be all the way forward to contact the first limit switch as described for FIG. 4. This sets a reference point from which carriage position while backing may be referenced from, such as a binary count of 0, or any other convenient binary count from encoder 75 (FIGS. 3, 4). As should be obvious, a bit count from encoder 75 is of a sufficient width to accommodate at least one revolution of the lead screw, with the microprocessor counting the number of revolutions as the carriage is driven from one end of the lead screw to the other. Such a calibration may not be needed every time the wagon is backed, but may be done as the lead screw and other components wear, or once for a predetermined number of times the trailer is backed. In the latter case, nonvolatile RAM could be used to store a last position of carriage 144 as determined by counting a number of turns the lead screw has taken away from the first limit switch since the last calibration with the first limit switch. After calibration and included at box 172, motor 56 drives carriage 144 to the nominal backing position (solid line position of carriage 144 in FIG. 11) as discussed above, which may be a null position where the steering tie rod end at the carriage is above the pivot point for the towbar, or a point near the pivot point of the towbar. As the tow vehicle commences to back the trailer, the query is posed at box 174 as to whether the towbar angle is changing. If the answer is YES, then the process flows to box 175 where the query is posed as to whether the towbar is moving toward a center position. If the answer is NO, then at box 176 the carriage is driven toward a position to reduce the change of the towbar angle rate. In other words, if the towbar angle is increasing, then the carriage is driven to steer the wheels to minimize the rate increase. If the answer at box 175 is YES, then at box 180 the carriage is driven to center the towbar angle. The process loops back to box 174 until the carriage is at a position such that no change of towbar angle occurs, which backs the wagon in an arc determined by the tow vehicle backing along the same arc. When the tow vehicle changes direction, causing a change of towbar angle, then the answer at box 174 is NO, and the process flows to box 178 where the query is posed as to whether the towbar is centered for backing the wagon straight back. If the towbar is centered, then the answer is YES and the process flows back to box 174 and repeats. If the answer at box 178 is NO, then the carriage is moved toward centering the towbar at box 180 and the process loops back to repeat at box 174. This loop causes the trailer to be backed straight when the towbar is centered. As the processes are occurring and repeating at around 30 Hz, dithering of the carriage occurs around the optimal positions of the carriage for backing straight back and around an arc as minor backing corrections are made. Such dithering may cause small jerking motions of the carriage that may cause undue wear or other undesirable effects, so a controller for backing may use a proportional-integral-differential (PID) algorithm, or any combination thereof, to smooth the carriage motions and achieve a faster response.

Figure 9:
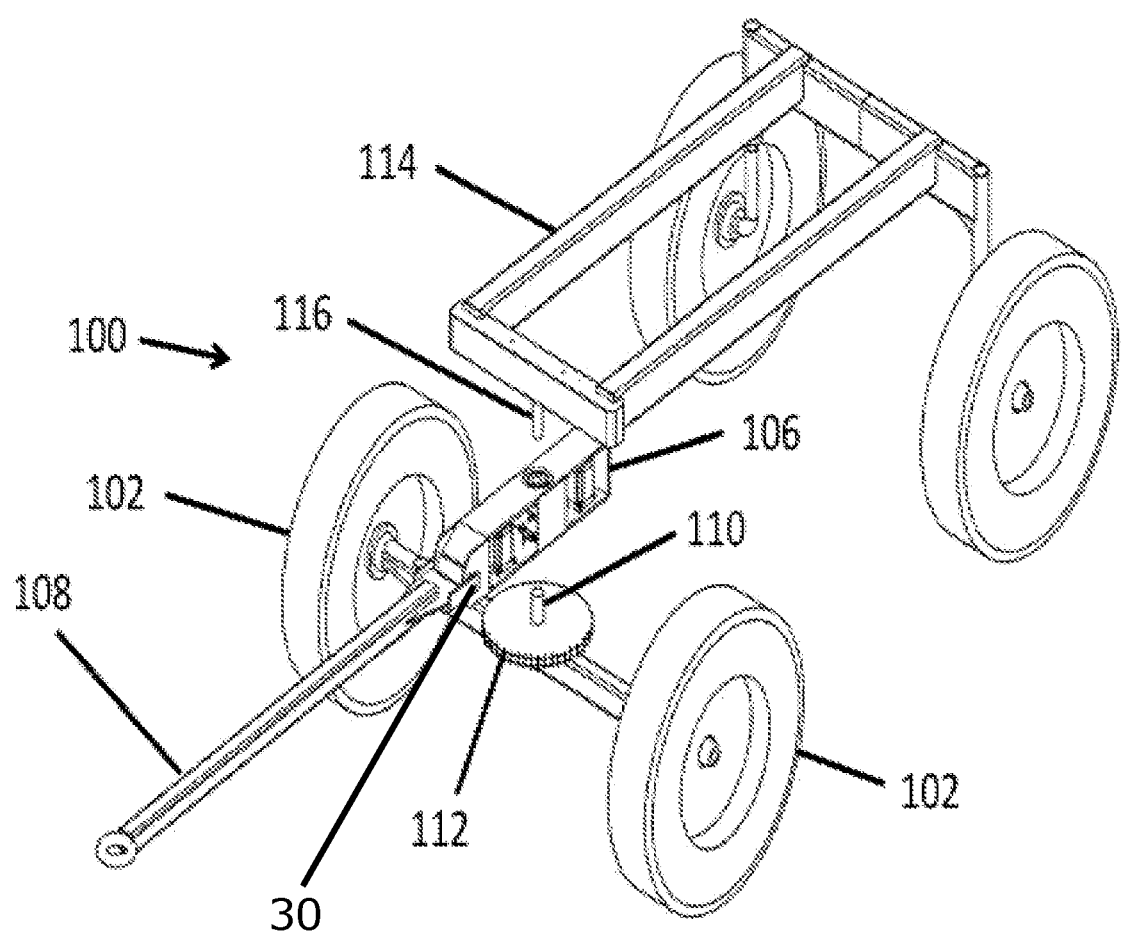
FIG. 9 is a perspective view of another embodiment of the instant invention.
Figure 13:
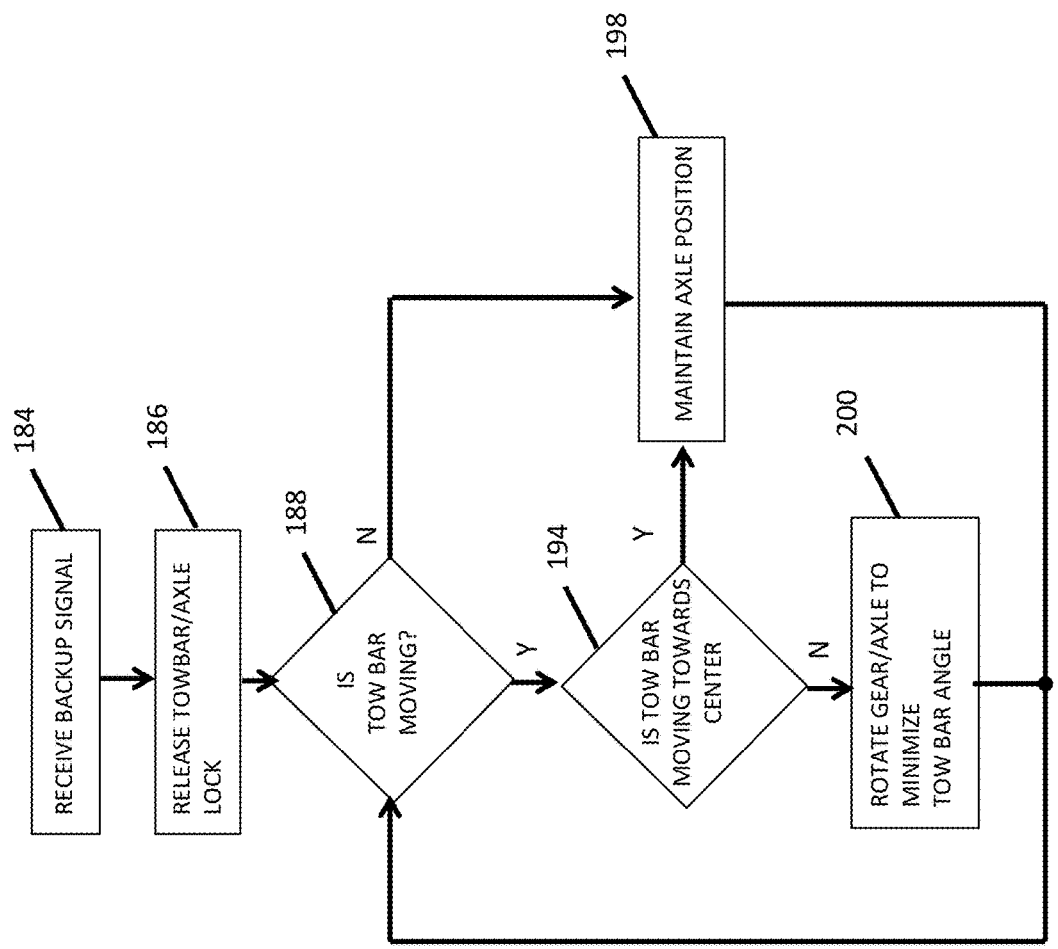
FIG. 13 is a process flow for operating the embodiment of FIG. 10.

For a steered axle embodiment, and referring to FIGS. 9, 10 and 13, at box 184 (FIG. 13) a backup signal is received by the microprocessor 115 associated with the wagon, and axle 104 (FIG. 9) is unlocked from the towing position at box 186. A check may be made at box 188 as to whether the system is in a backup mode, and if not then at box 190 the axle is driven to a perpendicular towing position with respect to the towbar and locked at box 192. The process then loops back to box 184 and repeats. Where the answer at box 188 is YES, then the process flows to box 194 where the query is posed as to whether the towbar is moving sideways. If the answer is NO then the process flows to box 196 where another query is posed as to whether the towbar is in a straight position to back the trailer straight back. If the answer is YES, then the axle position is maintained, allowing the trailer to be backed straight and the process loops back to box 194 and repeats. If the answer at box 196 is NO, then the wagon is being backed around an unchanging arc, so the process moves to box 198 where the axle position is again maintained and the process loops back to box 194 and repeats. If the answer at box 194 is YES, meaning that the trailer is being backed along a changing arc or corrections are being made while backing, then the axle is driven so as to steer the wheels in the same direction as sideways towbar divergence. This keeps the wagon backing along the same arc as backing of the tow vehicle.

Figure 14:
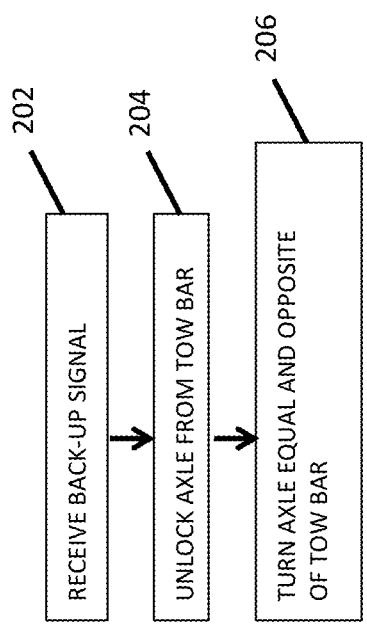
FIG. 14 is a process flow for operating the embodiment of FIG. 10 straight back.

The process flow of FIG. 14 shows the process for backing straight back with the steered axle embodiments of FIG. 9. Here, at box 202, a backup signal is received by the microprocessor in the control system of the wagon, which as noted may be from a backup light on the tow vehicle or a radio command, which unlocks the axle from the towbar at box 204. At box 206, the axle is steered the same number of degrees as towbar angle, but in an opposite direction. This steers the trailer straight back as the tow vehicle backs straight back. The process of FIG. 14 may be a separate subroutine from the process of FIG. 13, as by a separate command provided to a controller on the wagon.

In yet another embodiment, a tow dolly for towing a second trailer may be equipped with the system of the instant invention, except replacing the towbar angle sensor with an optical sensor. In this instance, the optical sensor would be located to view a front of a trailer attached to a fifth wheel of the tow dolly. Reference markers may be placed at front corners of the trailer within a field of view of the optical sensor, and which are used by a microprocessor to calculate an angle of the trailer. In another embodiment, an optical sensor may be located just in front of the fifth wheel with a field of view including an underside of the front of the trailer. A strip of material including reference lines viewable by the optical sensor would be attached underneath the front of the trailer in view of the sensor, as by magnetic strips, temporary adhesive or the like. In operation, as the trailer angle changed, the reference lines would correspondingly move and be detected by the optical sensor.

A controller, such as a PID controller, suitable for controlling automatic backing may be selected from any number of commercial off-the-shelf controllers, such as a programmable ARDUINO MEGA computing platform available from Arduino, www.arduino.cc and motor controllers, such as a SYREN 50, available from Dimension Engineering, Inc., located in Pittsburgh, Pa. Signal inputs from the encoders are connected to the ARDUINO board, with outputs connected to the motor controller. The motor controller in turn is connected to drive the motors. Programming of the ARDUINO board is accomplished by connecting a personal computer to the board and uploading programs via an ARDUINO interface.

Having thus described my invention and the manner of its use, it should be apparent to one of ordinary skill in the relevant arts that incidental changes may be made that fall within the scope of the following appended claims, wherein I claim:

1. A steering mechanism for a steered axle type wagon, said steering mechanism comprising:
 a rotatable joint connecting the steered axle to a towbar and a steering control actuator configured for coupling the towbar and the steered axle, and configured to rotate the steered axle relative to the towbar responsively to a measured angle of the towbar to a chassis of the wagon.

2. The steering mechanism of claim 1, wherein the rotatable joint comprises:
 a first king pin configured to be fixed to the steered axle and extending upwardly from a center of the steered axle;
 a second king pin configured to be fixed to the chassis of said wagon and extending downwardly; and
 a bracket comprising:
 a horizontal clevis pin or tube on a front end of the bracket configured for fitting into a clevis of the towbar and a vertical structural member configured to rotatably hold and align the first king pin and the second king pin.

3. The steering mechanism of claim 2, further comprising a sensor measuring the angle of the towbar relative to the chassis and a microprocessor, wherein the microprocessor is operationally coupled to the steering control actuator to rotate the steered axle relative to the towbar in response to measurements made by the sensor.

4. The steering mechanism of claim 2, further comprising an encoder that measures a rotational angle and of the second king pin in the vertical structural member and wherein the measured rotational angle is used by a microprocessor to control the steering control actuator.

5. The steering mechanism of claim 4, wherein the encoder additionally measures a rate of change of rotational angle of the second king pin.

6. The steering mechanism of claim 1, further comprising a solenoid configured to drive a pin into an opening in a driving gear and thereby lock the steered axle and steering mechanism together with the towbar positioned perpendicularly with respect to the steered axle.

7. The steering mechanism of claim 1, wherein the steering control actuator is electrically, hydraulically, or pneumatically powered.

8. The steering mechanism of claim 1, wherein the steering control actuator comprises a driving gear and the steering mechanism is configured to decouple horizontal movement of the towbar from the steered axle when the steered axle is pushed backwards such that the driving gear and the steering control actuator cooperate to rotate the steered axle relative to the towbar.

* * * * *